United States Patent
Adams et al.

(10) Patent No.: US 11,444,761 B2
(45) Date of Patent: Sep. 13, 2022

(54) DATA PROTECTION AND RECOVERY SYSTEMS AND METHODS

(71) Applicant: EthoPass, LLC, Boulder, CO (US)

(72) Inventors: Joshua Freeman Adams, Boulder, CO (US); David Patrick Forster, Miami, FL (US); Frank Barry Robertson, Arvada, CO (US)

(73) Assignee: ETHOPASS, LLC, Boulder, CO (US)

( * ) Notice: Subject to any disclaimer, the term of this patent is extended or adjusted under 35 U.S.C. 154(b) by 0 days.

(21) Appl. No.: 17/253,822

(22) PCT Filed: Jul. 12, 2020

(86) PCT No.: PCT/US2020/041522
§ 371 (c)(1),
(2) Date: Dec. 18, 2020

(87) PCT Pub. No.: WO2021/011343
PCT Pub. Date: Jan. 21, 2021

(65) Prior Publication Data
US 2022/0141012 A1 May 5, 2022

Related U.S. Application Data

(60) Provisional application No. 62/873,308, filed on Jul. 12, 2019.

(51) Int. Cl.
*H04L 9/08* (2006.01)
*H04L 9/14* (2006.01)
*H04L 9/30* (2006.01)

(52) U.S. Cl.
CPC .......... *H04L 9/0869* (2013.01); *H04L 9/085* (2013.01); *H04L 9/14* (2013.01); *H04L 9/3066* (2013.01)

(58) Field of Classification Search
CPC ......... H04L 9/0869; H04L 9/085; H04L 9/14; H04L 9/3066
See application file for complete search history.

(56) References Cited

U.S. PATENT DOCUMENTS

| 8,259,947 B2 | 9/2012 | Rose et al. |
| 10,057,061 B1* | 8/2018 | Maeng ............... H04W 12/0431 |
| 2004/0117625 A1* | 6/2004 | Grawrock ............. H04L 9/0877 713/168 |

(Continued)

OTHER PUBLICATIONS

Yang Jeong Rok, International Search Report and Written Opinion, dated Oct. 15, 2020, Ten Pages, Korean Intellectual Property Office, International Application Division, Republic of Korea.

*Primary Examiner* — Philip J Chea
*Assistant Examiner* — Sangseok Park
(74) *Attorney, Agent, or Firm* — Schneider IP Law LLC (57) ABSTRACT

A method of securely replacing a first data value with a second data value and related systems are disclosed. The method includes generating a first public key and a first private key, generating a cryptographic seed value, and passing the cryptographic seed value through an elliptic curve to generate a second public key and a second private key. The method further includes combining the first public key with the second private key using public key cryptography to create a shared encryption key and passing the shared encryption key through a symmetric algorithm to encrypt the cryptographic seed value.

8 Claims, 5 Drawing Sheets

(56) References Cited

U.S. PATENT DOCUMENTS

| | | |
|---|---|---|
| 2012/0008775 A1 | 1/2012 | Natarajan |
| 2013/0227279 A1 | 8/2013 | Quinlan et al. |
| 2015/0180661 A1 | 6/2015 | Fujii et al. |
| 2016/0191494 A1* | 6/2016 | Claes .................. G06F 21/31 |
| | | 713/159 |
| 2017/0338951 A1 | 11/2017 | Fu et al. |
| 2019/0253249 A1* | 8/2019 | Meng .................. H04L 9/0841 |
| 2020/0127817 A1* | 4/2020 | Wu ........................ H04L 9/14 |

* cited by examiner

DATA PROTECTION AND RECOVERY SYSTEMS AND METHODS

CROSS-REFERENCE TO RELATED APPLICATIONS

This application claims priority to International Application No. PCT/US20/41522, filed Jul. 10, 2020, and entitled "Data Protection and Recovery Systems and Methods," the entire disclosure of which is hereby incorporated by reference for all proper purposes. This application claims priority to U.S. Provisional Application No. 62/873,308, filed Jul. 12, 2019 and entitled "Data Protection and Recovery Systems and Methods," the entire disclosure of which is hereby incorporated by reference for all proper purposes.

FIELD

This invention is related to computing system security. Specifically, but not intended to limit the invention, embodiments of the invention are related to securely updating user data.

BACKGROUND

With the proliferation of internet usage and software as a service, service providers, such as those providing software as a service, have been faced with increasingly complex threats to data security, in particular middle person attacks. To combat these threats, service providers have implemented various steps to authenticate users who are attempting to update data associated with the users' accounts. Typically, the user is asked to provide a password. If the user does not know his or her password, the service provider will generally send a text, email, or message via 3rd party to the user as a method of authentication. This method, however, is vulnerable to attack, in part because user emails are often easily accessible on their mobile phones, and because a single email can be used to "hack" numerous accounts held by a single user. There therefore remains a need for service providers to offer a secure means for users to change data associated with user accounts.

SUMMARY

An exemplary system has a first non-transitory computer-readable medium storing a first program and a second non-transitory computer-readable medium storing a second program. The first program and second program include instructions that, when executed by one or more processors, execute a method of securely replacing a first data value with a second data value. The method includes generating a first public key and a first private key, generating a cryptographic seed value, and passing the cryptographic seed value through an elliptic curve to generate a second public key and a second private key. The method includes combining the first public key with the second private key using public key cryptography to create a shared encryption key and passing the shared encryption key through a symmetric algorithm to encrypt the cryptographic seed value.

An exemplary first non-transitory computer-readable medium storing a program including instructions that, when executed by a processor, executes a method of securely replacing a first data value with a second data value. The method includes creating a first public key and a first private key, generating a cryptographic seed value, and passing the cryptographic seed value through an elliptic curve to generate a second public key and a second private key. The method further includes combining the first public key with the second private key using public key cryptography to create a shared encryption key and passing the shared encryption key through a symmetric algorithm to encrypt the cryptographic seed value.

DETAILED DESCRIPTION

By way of introduction to the details of the invention, a protocol is described. The ARQ protocol represents a communication layer to achieve four primary functions, such as setting up a new account or database entry, or verifying the incoming data before entry. Once a record is set, a connection is able to verify against the record. The communication pipeline may be monitored using a session variable. If that account record needs to be reset with new uncorrupted data, then the initiator of that process may update the record with an enhanced verification process.

The ARQ (autonomous request query) protocol works with a few primary pieces of technology that may be configured in one of many various schemes. ARQ represents a software development kit (SDK), or a set of tools which handle the functional aspects necessary for the key setting and resetting process. The primary purpose of this SDK is to authenticate and authorize users.

This works by issuing four primary functions of the SDK: setting up a new user record, and saving to a durable record; verifying against the user record for re-entry; monitoring the user session for takeover or manipulation; and securely updating user information in the event of a breach.

The use cases are not limited to a single industry, as the 1-to-1 key reset solves the problem of trying to verify one party to another securely, without the necessity of using a 3-party service.

Connection Initialization. Every connection may be initialized using a public key exchange to secure a message pipeline. Once a secure message pipeline has been created. The message negotiation may begin.

Additionally, if the authenticity of the responding machine cannot be verified, a trusted 3rd party may be used to verify transmitted public key sets used to secure the message tunnel. Using a verified 3rd party may help protect against key spoofing, or an in-transit attack. If the initial key is swapped with a malicious key, the attacker can listen in on the conversation in what is known as a "middle-person attack."

The messaging tunnel may be secured using most technologically current best practices. Once the initial message pipeline has been secured the primary processes may begin. The core design of the system was built to ensure that even if the transmitted message contents are leaked. They pose no security risk, as the all values are either; asymmetric public keys, or pre-encrypted ciphertext.

Setup. To set up a new keystore using the ARQ protocol there are three primary pieces of information necessary: A) 1st "Primary" Asymmetric Key, B) 2nd "Update" Asymmetric Key, and C) Asymmetrically Encrypted Ciphertext "Update Package".

The first "primary" asymmetric key may be any value that could potentially be used for authentication, or authorization. The second "Update" asymmetric key may be issued with one of many elliptic curve algorithms known to those skilled in the art.

The asymmetrically encrypted "update package" in embodiments described herein is unique to this process. To create the update package the steps may be as follows:

A symmetric encryption algorithm must be selected. Various symmetric encryption algorithms have different input requirements to generate secure ciphertext, some may require that a nonce, or 'number used once,' be selected. If a nonce is required, then the corresponding nonce size must be correct for the selected algorithm.

A pseudo randomly generated value is passed to a cryptographically secure hashing algorithm. The hashing algorithm may output a cryptographically secure hash with a minimum length, such as a minimum length of 32 bytes. In some embodiments, the hashing algorithm may use at least 256-bits of entropy or ~32 bytes, and the secure hash is passed through an elliptic curve to create a public, and private key set. The secure hash used to create this keyset must be temporarily held until it can be secured using the symmetric encryption process. Next, a primary authentication/authorization identification value must be selected or generated. The primary authentication/authorization value could be one of many types of identifiers including but not limited to: a hashed passphrase, an asymmetric key set, or any other value deemed acceptable.

On the output one may have: 0) Primary authentication value/key, 1) Nonce (if required), 2) Secure Hash, 3) 1st pseudo randomly generated public the corresponding private key set (the private key is immediately zeroed from memory once a shared encrypted key has been generated), 4) 2nd public and private key set.

The 1st private key, and the 2nd public key are passed through a public key cryptography system to generate a shared encryption key. Once the shared key is generated, the 1st private key is removed, and permanently deleted. The shared key, nonce, and secure hash are passed through a symmetric encryption algorithm. The shared key is used as the primary encryption key, utilizing the nonce if needed. The secure hash is the value or message being encrypted. Once the resulting ciphertext has been created, the secure hash is removed from memory as well.

Next the 1st public key, nonce (if used), and the output ciphertext are packaged together.

With this, the only way to recover or decrypt the ciphertext to retrieve the encrypted hash value is to recall or rebuild the corresponding 2nd private key. In some embodiments, a method may include to regenerate the 2nd private key from a valid key derivation schema built using secure values. The 2nd private key may also be stored on a secondary device or held in any form that can be securely and accurately recalled. It is not advised to 'move,' the 2nd private key computationally. This may create a secondary record that could be captured or exfiltrated.

In some embodiments, a process may maintain an 'air gapped,' environment away from programmatic access to the keying material. The 2nd private key is the only required value needed to successfully decrypt the ciphertext. If the 2nd private key is kept secure. The successful decryption of the resulting ciphertext may be used as verifiable proof to update the primary authentication/authorization value/key.

Successful negotiation is the process of recalling stored information, and regenerating the previously deleted key values. In order to create the correct values needed, the type of symmetric encryption algorithm, and elliptic curve algorithms must be known. If the algorithm types have been lost or misconstrued. An algorithm type brute-force strategy may be employed.

In some embodiments, the process of negotiation is as follows: 1) The ciphertext, nonce (if used), and 1st public key are recalled from memory or requested from the storing entity. 2) The 2nd private key is either regenerated, or recalled for use. 3) The 1st public key, and the 2nd private key are passed through a public key encryption scheme to generate the 2nd shared key. 4) The 2nd shared key, and nonce passed through the correct symmetric encryption algorithm to decrypt the ciphertext. If successful, the original secure hash is returned. 5) The secure hash is then passed through the same elliptic curve algorithm used to generate the 1st public key. 6) The 1st private key, and a newly selected or generated primary authentication/authorization value/key are passed through an asymmetric encryption signing algorithm, creating a cryptographic signature of the primary authentication value/key. 7) The signed primary authentication value/key is then verified by the origin that stored the 1st public key and ciphertext. If the cryptographic signature is validated successfully by the 1st public key, then the newly selected primary authentication key may be safely updated.

This process may be used to update any data value that could require a secure one-to-one update scheme. The utilization of the signing algorithms ensures that any information transmitted is verifiably correct, or was not tampered with in transit.

Session. If additional security or monitoring is required during the key negotiation. A non-tamperable session may be created, and utilized to verify a secure message tunnel. Many different session schemes may be employed as an additional verification value. One possible session scheme are one-time shifting session values. This adds an additional value to be verified before any transmitted message may be fully unpacked.

Initially a pseudo random byte string is selected. The byte string is broken down into base-2 or binary format. Each time a message is transmitted or received. The binary array is 'shifted,' or 'stepped' on a predefined shift parameter field. Each message may then contain the unique shift value. Any reused value becomes evidence of a possible attack or network error. If a value is reused more than once the session is broken and reinitiated from start.

Symmetric Encryption Layered Session. A symmetric encryption layered session may utilize the shifting 'stepped,' session key, as the primary encryption/decryption key. This process requires that the sender/receiver have successfully, and securely negotiated the necessary key values. Requiring both parties to know the key stepper mechanics, polynomial field size, initial session byte value, and the selected algorithm sets. If the selected symmetric encryption algorithm requires a nonce, then it must also be known by both parties. In order to successfully set up the required prenegotiation values a public key scheme may be used to securely transfer the necessary values.

The symmetric encryption algorithm is used to keep all transmitted values private across the wire. Each time a message is transmitted the required encryption/decryption key may be the next session shifter value. I.E. One possible scheme may be: party A, uses key0 to encrypt the first message, then party B uses key0 to decrypt. On the next message sequence, the key is shifted, and party B uses key1 to encrypt, and party A uses key1 to decrypt. If at any time either party loses the 'count,' the process is broken, and reset from the start. This ensures that if the transmitted values are tampered with, or are hijacked in transit. No critical information is leaked by either party, while providing possible evidence of an active attack or a potential network malfunction. This is especially useful when any message negotiation is being completed within a hostile environment, because the transmitted values could be used to fingerprint the user. One example may be useful when privacy is of the utmost concern. If an associated key value could be tied to a critical persona, machine, or personal identity.

Non-Encrypted Session. The non-encrypted session uses may employ a message signature schema wherein both parties are required to sign incoming/outgoing messages wherein the underlying transport layer security is used. The shift value is used as the signed request verification key. If each transmitted message utilizes the unique shifted value, each message signature will be unique and verifiable. This allows either party to verify if a message was "replayed," or tampered with adding an additional verification medium. This is especially useful when a signed time vector can't or shouldn't be used due to time constraints, or internationalization.

Session Life Cycle. The session life cycle is fragile and frail by design. All sessions may be reset if any of the following faults occur: package or signature is retransmitted more than one time, encoding doesn't match specifications, responder or requestor signatures are unable to be verified, symmetric encryption package can't be decrypted, session timeout, transport layer security is compromised. If a session is reset for any reason, a physical boolean request may continue the interaction. If a physical person is required to make authentication or authorization requests. Any of these disqualifying events may or should lead to increased logging parameters if a potential breach is in progress.

System Recovery. If a system is breached, and all associated account records need to be re-secured. Then a passive or active recovery process may occur. The recovery process assumes that the required private key material has not been breached. If the necessary key material needs to be regenerated, then it should be done on a non-compromised machine. Once the necessary private keying material has been recreated or recalled. Each of the corresponding record holders storing a primary authentication value/key, 1st public key, and related ciphertext. Must be contacted to flag the accounts as possible targets. Once flagged, each account may begin the ciphertext decryption process to sign a new primary authentication value/key. The primary component of this process is that with each authentication reset. Entirely new private/public key sets should be generated and used. This ensures that if the corresponding private key material was captured. The new values are no longer compromisable. The old 2nd private key, should be discarded after a successful negotiation with the service provider has occurred. An optimal strategy to employ may be using a key derivation process that requires offline or air gapped material to regenerate the necessary private keying material. This may help to ensure that the new keyset is not captured or exfiltrated from an internet connected machine.

Recovery Network. The recovery network is a database method where a potential user secures their private key material in/on a remote system, which is provided with a specific maximum memory allocation or data type. This may help ensure all data stored is not corrupted. This remote system may require each memory slot only store an encrypted file that only the originator may decrypt. The storage mechanism necessary to "backup," or clone data to another data storage medium gives the user various options for recalling their encrypted file, as long as each memory slot was only given secure encrypted material, even if every file was copied and selectively brute forced. It would be near impossible to yield any meaningful theft in any reasonable amount of time. This type of database may be private, semi-private, semi-public, or public; as long as all stored material is encrypted before transit. One option may be to use a central consensus and immutable record sets to save; and verify data integrity of all servers involved. The memory allocation may also be saved directly to local media. A deception system may also be used or activated by entering a preselected deception key. All deceptive keysets open what look like regular, or real accounts. Any storage of remote private key material is not recommended but may be necessary to aid users in secure recall of critical private keying material recall.

Zone keys. Zone keys are the use of similar asymmetric keying schemas that are specifically correlated with machine-to-machine interactions. The purpose of a zone key is to simplify, secure, and identify system interactions. A key feature of the zone key schema is that they are not specifically tied to the service, or person. They are not registered, merely created and destroyed when needed. Zone keys are used to securely handoff interactions between protected internal services. A zone key may be durable, or nondurable; for single use, or re-useable. The option is selected for the situation that works best for the underlying service communication layer. Codex. A codex is a protocol to create, cycle, and provision cryptographic key schemas. The base idea is that in order to protect an organization a secure process must be used to create, cycle, and provision employee access to internally or externally business owned services. The codex chain may be based on one of many subsets of relational key setup material; stateless, stateful, spherical deterministic, radix or merkle counter based key trees, to generate the necessary keying material. The selection of specific model changes the provisioning and input key material. The selection of a specific model has added benefits for some organizations over others, because an internet company may prefer a stateless model as their primary key derivation function, which would require memorized content to recreate the correct input values. In contrast, a hospital may want a stateful model correlated to the individual department, service, or machine identifier codes.

Some embodiments include using a pseudo randomly selected mnemonic phrase. This mnemonic phrase is used as input material to a key derivation function, or a cryptographic function that returns a non-reversible output. This protects the root key generation material. Then account creation may begin utilizing a root value to generate the necessary private keys.

Generated keys may be registered with specific services and should never be reused. Each private keyset is a single service key. Private keying material should never be used more than once.

Any system may specify when keys may be rotated. This may be accomplished through setting a timed flag associated with the primary authentication value/key, 1st public key, and ciphertext. When a user attempts to utilize the primary authentication value/key, the system may deny the request, essentially forcing an invalidation of the primary authentication value. The only remedy would be to successfully negotiate the correlated ciphertext material. A system that utilizes deauthorizing primary authentication values/keys on a timed basis have the additional benefit of closing potential breaches faster. If keys are required to be renegotiated every 12 hours. Any users who have keysets that have been compromised will be actively notified, because they will no longer be able to access the system. If an attacker has exfiltrated the necessary keysets, their isolated machine may negotiate the ciphertext update, creating two divergent key branches and invaliding one, because all encryption functionality is individually distributed on the remote negotiating system. The computational overhead is also distributed, thereby not requiring a centralized service to handle all functional processing, thus ensuring that a single cryptographic function creation machine cannot be compromised removing another single point of failure.

Hardware Provisioning Model (some account protections). A hardware provisioning model may be setup on machines or devices for "drop-in setup," or specific hardware keys and cryptographic material. In some embodiments, a hardware key is used, enabling additional keysets to be added, such as access keys, computer drive decryption keys, which may only be breached if the physical medium is connected to an internet connected machine, or physically stolen.

Recovery. If a user needs to have access terminated or their accounts have been breached, then the recovery process may be initiated. The key regeneration process may be completed on an air-gapped offline machine. Then ciphertext negotiation may begin only after the necessary keys are recreated. If the associated 1st public key, and related ciphertext are stored locally. Then the ciphertext, and new authentication values may be selected, signed, and 'readied,' before being connected to an internet connected machine. If an air-gapped process is used, the transmitted keying material has a superior security status, because the possibility of key derivation material being captured is much lower. The process may include: 0) recovery drive pulled from secure location 1) Primary phrase used to regenerate key sets and request update packages 2) Update packages (1st public key, and ciphertext) are stored on removable durable storage 3) recovery drive and update packages are combined on air-gapped offline system 4) new key-sets are created for each individual system 5) primary authentication values updated 6) Update packages are loaded onto removable media 7) update packages are transmitted.

The goal of this interaction is that if a user is breached or attacked, then the user may take specific measures to regenerate secure key material. This air-gapped recovery system may require: two removable drives or remote databasing systems.

Recovery Branch. When the key (or keys) are created, a 'recovery branch' may be created. The recovery branch uses three pieces of information to create a key pool. A key pool is a grouping of the necessary 1st and 2nd asymmetric key sets. A recovery branch may use a standardized initialized counter system to generate deterministic keysets. The length of the count does not matter as much as the starting point. If a counter version is updated, all keys will have to be updated as well, noting that each keyset contains the necessary material to recreate the necessary 2nd private key.

To create the key pool one of many methods may be used, such as to use the seed key (or keys) with a counter module. Ex. an initial counter could be: 0x80000001, 0x80000002, 0x80000003, 0x80000004, etc. Using a hexadecimal counter maintaining a scalar base 8 is one simplistic possibility.

Once a key branching mechanism is selected, the root material is combined and passed to a key derivation function that may generate cryptographically nonreversible keys. Entropy hardening may also be employed to a hashing function and hashed (1 to (x)) times. The number of 'times' a value is hashed the greater the resulting entropy will be yielded, increasing the time of regeneration necessary upon recovery.

The resulting output hash may then be passed to a number of different elliptic curve or non-elliptic curve algorithms. The only requirement being that a public key, and private key are generated. Then immediately upon generation of the key material the hash or seed values are overwritten or deleted from memory.

Account Alert. An internal deception program may be employed to protect critical key values. The goal of the key authentication model is one that may make it impossible to brute force such an encryption standard. This leaves one primary avenue of attack, the physical person. Also known as "the fingernail test," or "wrench test" which means that someone has the ability to pull your fingernails or hit you with a wrench until you give up your private key material.

In order to get around this potential physical attack, a shadow program may be activated on the service if the user is using the "passphrase," configuration to encrypt & decrypt private key material held locally. The shadow service may be activated by entering a specific data value. The primary one being the user entering their passphrase into the decrypt screen. Fictional keysets are output. Each keyset may have similar primary values stored on remote systems. The primary difference is that when the primary authentication value is accessed, or the ciphertext is requested to update the primary account value. All actions are completed against a deceptive sandboxed environment that looks real or is even the actual environment. The difference is this is an "alert" mode being activated. Every account notification transmitted or every request that is made may have a hidden "ALERT," attached to it. This may signal that the user is in trouble or that a possible account takeover has occurred forcefully.

In order to achieve this, upon account creation an additional flagged keyset is registered with the target service. The shadow account may mirror the primary account. This provides the added benefit of being able to potentially alert multiple systems simultaneously that a user may be in grave danger, or malicious key manipulation has occurred. In the event that an attacker is trying to access multiple systems using the 'shadow key,' sets. Each service could help alert local authorities for maximum effectiveness.

MacGuffin Box™. The term "MacGuffin Box" is a trademark of the Applicant. The following describes embodiments of a method.

The update key is used as the verification medium that confirms that the MacGuffin Box was negated correctly. If a 'valid,' asymmetric signature value is able to be correctly verified, then the public key or the primary identifier/authentication medium may be reset securely. The MacGuffin Box represents an encrypted seed value, which can only be decrypted by the correct key private key value. The MacGuffin box is a seed value, or a value that is passed to an elliptic curve function to create an output of 1. Public key, 2. Private key. The public/private key pair may be used in a signing fashion. I.E. The private key may be passed to a mathematical function with a piece of data to create a cryptographically unique signature value. The output signature value has the ability to be verified by the corresponding public key.

The output public key is the Update Key. The output private key corresponding to the public key (Update Key) is immediately deleted upon generation. If the corresponding private key, is not successfully deleted, the recovery process could be broken. The MacGuffin Box may be encrypted using any symmetric encryption value. The reason that any symmetric encryption value may be used is that two asymmetric key groups are used to create a shared key, which resembles a symmetric encryption key. Popular encryption mechanics like AES require a nonce, or 'number used once,' in order to complete a successful encryption function. If this is the case, then the nonce must be concatenated to the end of the output encrypted cypher text, which makes the output key generation graph to create a viable public key, update key, and MacGuffin box. On the inverse side, all that is needed to utilize the MacGuffin box is for the creator or the authenticating user to create/use an authentication value, shared phrase, asymmetric public key, or any authenticating value that is desired. All that may be needed to reset the primary authentication value is for the owner to possess the corresponding private recovery key and know the correct algorithm used to encrypt the MacGuffin box, and the elliptic curve algorithm used to create the corresponding update key (public key), which makes the recovery/reset process. The private recovery key (private rec key) is then the decrypting value needed to unlock the MacGuffin box.

Figure 1:
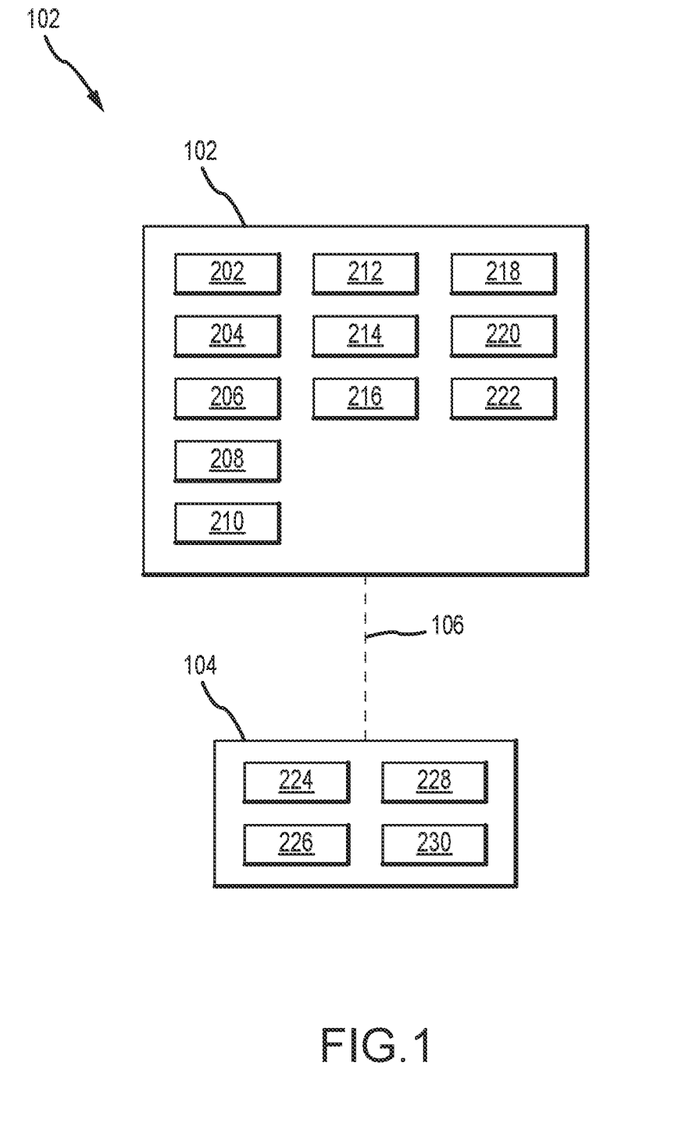
FIG. 1 is a schematic of an exemplary system.

Turning now to FIG. 1, a system 100 is described. The system 100 may include a first non-transitory computer-readable medium 102 storing a first program and a second non-transitory medium 104 storing a second program. The first program and second program may include instructions that, when executed by one or more processors, execute a method 200 (see also FIG. 2) of securely replacing a first data value with a second data value.

Figure 2:
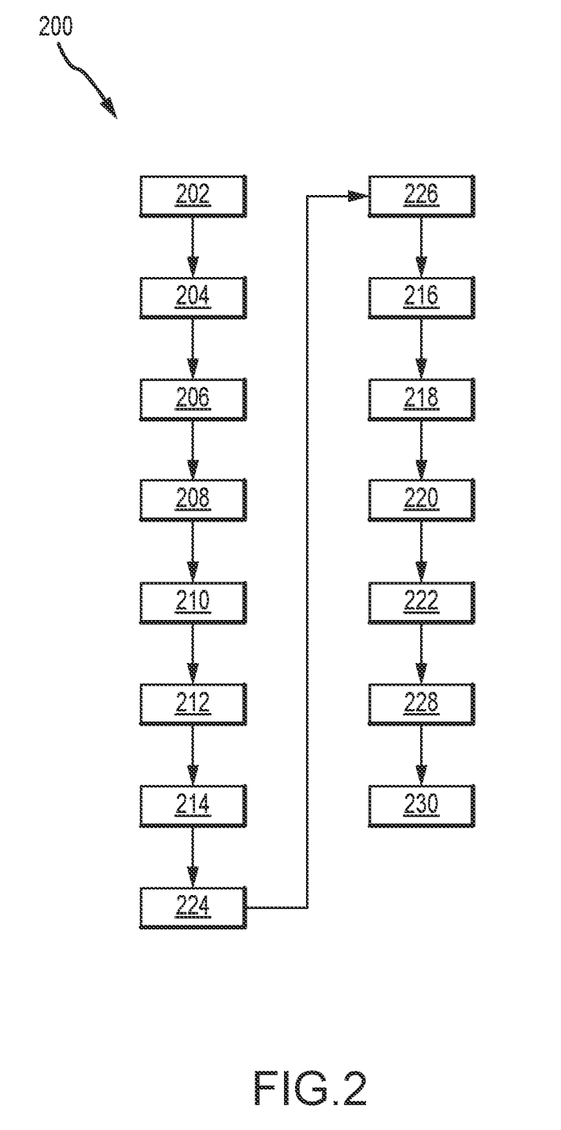
FIG. 2 is a flowchart of an exemplary method.

The method 200 may include generating a first public key and a first private key, generating cryptographic seed value 204, and passing the cryptographic seed value through an elliptic curve to generate a second public key and a second private key 206. The method 200 may include combining the first public key with the second private key using public key cryptography to create a shared encryption key 208, and passing the shared encryption key through a symmetric algorithm to encrypt the cryptographic seed value 210.

The method optionally includes removing the second private key after creating the shared encryption key and before passing the shared encryption key through the symmetric algorithm 212.

The method 200 optionally includes sending the encrypted cryptographic seed value and the second public key through a communications interface 106 from the first non-transitory computer-readable medium to the second non-transitory computer-readable medium 214.

The method 200 optionally includes receiving the encrypted cryptographic seed value and the second public key on the second non-transitory computer-readable medium 224. The method 200 optionally includes using the second public key and the first private key, generating a second shared key to decrypt the encrypted cryptographic seed value and to generate a decrypted cryptographic seed value 226.

The method 200 optionally includes receiving the decrypted cryptographic seed value from the second non-transitory computer-readable medium on the first non-transitory computer-readable medium 216. The method 200 optionally includes passing the decrypted cryptographic seed value through an elliptic curve to re-generate the second private key 218. The method optionally includes using the re-generated second private key, cryptographically signing the second data value 220.

The method 200 optionally includes sending the second signed data value through a communications interface to the second non-transitory computer-readable medium 222.

The method 200 optionally includes receiving the second signed data value 228. The method 200 optionally includes using the second public key, verifying that the first private key was used to decrypt the encrypted cryptographic seed value 230.

A first non-transitory computer-readable medium 102, which may reside on, for example only, an employee computer, may perform method steps 202, 204, 206, 208, 210, 212, 214, 216, 218, 220, 222. A second non-transitory computer-readable medium 104, which may reside on, for example, an employer computer or third party service provider network, may perform method steps 224, 226, 228, 230.

Figure 3:
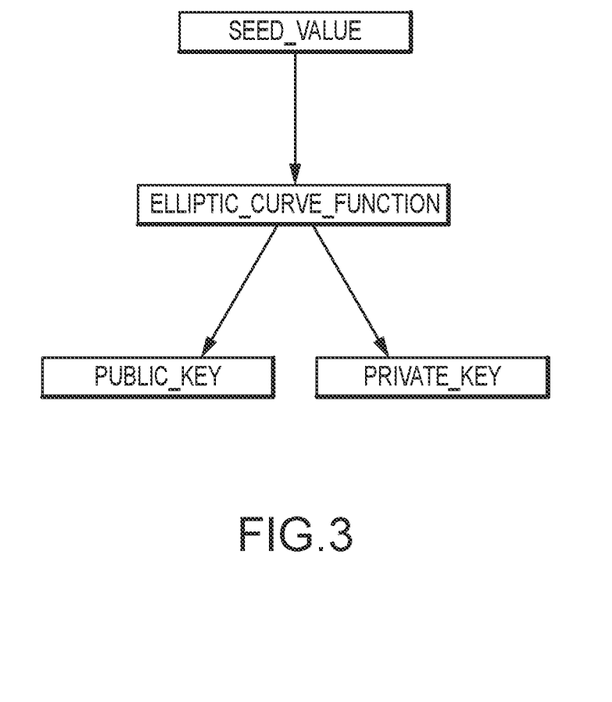
FIG. 3 is a flowchart of an exemplary method.
Figure 4:
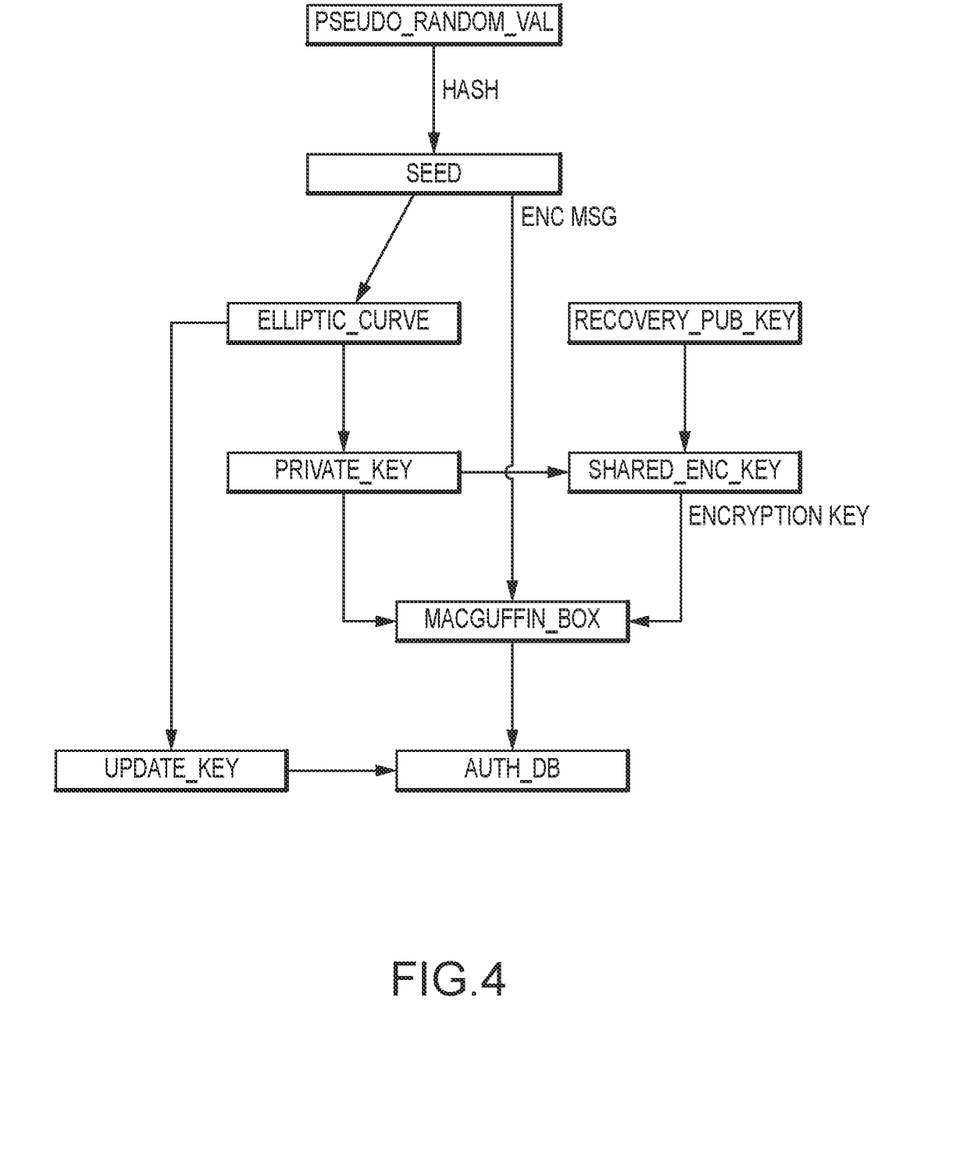
FIG. 4 is a flowchart of an exemplary method.
Figure 5:
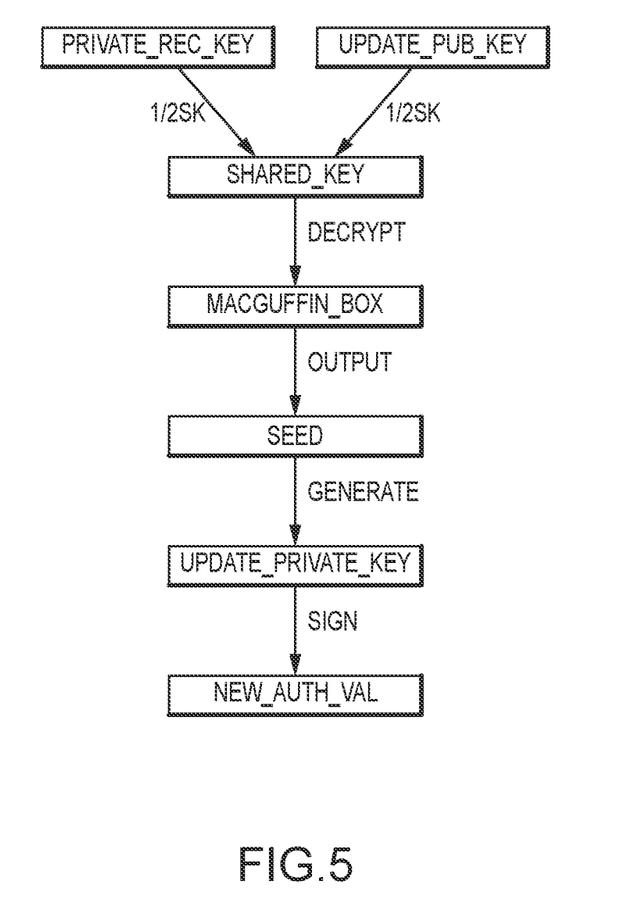
FIG. 5 is a flowchart of an exemplary method.

FIGS. 3-5 illustrate various flowcharts of features of the method 200, to better visually understand the embodiments described herein.

Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms—even if only the function or result is the same. Such equivalent, broader, or even more generic terms should be considered to be encompassed in the description of each element or action. Such terms may be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "processor" should be understood to encompass disclosure of the act of "processing"—whether explicitly discussed or not—and, conversely, were there only disclosure of the act of "encrypting", such a disclosure should be understood to encompass disclosure of an "encrypting mechanism". Such changes and alternative terms are to be understood to be explicitly included in the description.

Those skilled in the art can readily recognize that numerous variations and substitutions may be made in the invention, its use and its configuration to achieve substantially the same results as achieved by the embodiments described herein.

Accordingly, there is no intention to limit the invention to the disclosed exemplary forms. Many variations, modifications and alternative constructions fall within the scope and spirit of the invention as expressed in the claims.

What is claimed is:

1. A system comprising a first non-transitory computer-readable medium storing a first program and a second non-transitory computer-readable medium storing a second program, the first program and second program including instructions that, when executed by one or more processors, execute a method of securely replacing a first data value with a second data value, the method comprising:
   generating a first public key and a first private key;
   generating a cryptographic seed value;
   passing the cryptographic seed value through an elliptic curve to generate a second public key and a second private key;

combining the first public key with the second private key using public key cryptography to create a shared encryption key;

passing the shared encryption key through a symmetric algorithm to encrypt the cryptographic seed value;

sending the encrypted cryptographic seed value and the second public key through a communications interface from the first non-transitory computer-readable medium to the second non-transitory computer-readable medium;

receiving the encrypted cryptographic seed value and the second public key on the second non-transitory computer-readable medium;

using the second public key and the first private key, generating a second shared key to decrypt the encrypted cryptographic seed value and to generate a decrypted cryptographic seed value;

receiving the decrypted cryptographic seed value from the second non-transitory computer-readable medium on the first non-transitory computer-readable medium;

passing the decrypted cryptographic seed value through an elliptic curve to re-generate the second private key; and using the re-generated second private key, cryptographically signing the second data value.

2. The system of claim 1, wherein the method further comprises:
removing the second private key after creating the shared encryption key and before passing the shared encryption key through the symmetric algorithm.

3. The system of claim 1, wherein the method further comprises:
sending the second signed data value through a communications interface to the second non-transitory computer-readable medium.

4. The system of claim 3, wherein the method further comprises:
receiving the second signed data value;
using the second public key, verifying that the first private key was used to decrypt the encrypted cryptographic seed value.

5. A first non-transitory computer-readable medium storing a program including instructions that, when executed by a processor, executes a method of securely replacing a first data value with a second data value, the method comprising:
generating a first public key and a first private key;
generating a cryptographic seed value;
passing the cryptographic seed value through an elliptic curve to generate a second public key and a second private key;
combining the first public key with the second private key using public key cryptography to create a shared encryption key;
passing the shared encryption key through a symmetric algorithm to encrypt the cryptographic seed value;
sending the encrypted cryptographic seed value and the second public key through a communications interface to a second non-transitory computer-readable medium;
using the second public key and the first private key, creating a second shared key to decrypt the encrypted cryptographic seed value and to output a decrypted cryptographic seed value;
receiving the decrypted cryptographic seed value from the second non-transitory computer-readable medium;
passing the decrypted cryptographic seed value through an elliptic curve to re-generate the second private key; and
using the re-generated second private key, cryptographically signing the second data value.

6. The first non-transitory computer-readable medium of claim 5, wherein the method further comprises:
removing the second private key after creating the shared encryption key and before passing the shared encryption key through the symmetric algorithm.

7. The first non-transitory computer-readable medium of claim 5, wherein the method further comprises:
sending the second signed data value through a communications interface to the second non-transitory computer-readable medium.

8. The first non-transitory computer-readable medium of claim 7, wherein the second method further comprises:
receiving the second signed data value;
using the second public key, verifying that the first private key was used to decrypt the encrypted cryptographic seed value.

* * * * *